United States Patent
Martinsson

(10) Patent No.: US 7,155,092 B2
(45) Date of Patent: Dec. 26, 2006

(54) OPTICAL CABLE WITH IMPROVED TRACKING RESISTANCE

(75) Inventor: Hans-Bertil Martinsson, Varekil (SE)

(73) Assignee: Borealis Technology Oy, Porvoo (FI)

(*) Notice: Subject to any disclaimer, the term of this patent is extended or adjusted under 35 U.S.C. 154(b) by 206 days.

(21) Appl. No.: 10/480,192

(22) PCT Filed: Jun. 6, 2002

(86) PCT No.: PCT/EP02/06225

§ 371 (c)(1),
(2), (4) Date: May 27, 2004

(87) PCT Pub. No.: WO02/101440

PCT Pub. Date: Dec. 19, 2002

(65) Prior Publication Data

US 2004/0213527 A1    Oct. 28, 2004

(30) Foreign Application Priority Data

Jun. 12, 2001    (EP) .................. 01114263

(51) Int. Cl.
*G02B 6/44* (2006.01)
*G02B 6/00* (2006.01)

(52) U.S. Cl. .................. 385/100; 385/141; 385/144; 385/145

(58) Field of Classification Search ................ 385/100, 385/141, 144, 145

See application file for complete search history.

(56) References Cited

U.S. PATENT DOCUMENTS 6,074,724 A * 6/2000 Inaba et al. .................. 428/141

FOREIGN PATENT DOCUMENTS

| WO | WO 9305424 A1 * | 3/1993 | .................. 385/100 |
| WO | WO 9703124 A1 * | 1/1997 | .................. 428/378 |
| WO | WO 9935652 A1 * | 7/1999 | .................. 523/173 |

OTHER PUBLICATIONS

International Search Report pertaining to International Application No. PCT/EP01/06225.

* cited by examiner

*Primary Examiner*—Brian Healy
*Assistant Examiner*—Jerry Martin Blevins
(74) *Attorney, Agent, or Firm*—Fay, Sharpe, Fagan, Minnich & McKee, LLP

(57) ABSTRACT

The present invention is concerned with an optical cable with improved tracking resistance comprising at least one optical fiber and an outer sheath which comprises a polymeric material, characterized in that the polymeric material forms a matrix for the sheath and consists of a multimodal olefin polymer obtained by a coordination catalyzed polymerization, and in that the total composition of the sheath comprises 15–40% by weight of a metal hydroxide, preferably magnesium hydroxide and/or aluminium hydroxide, and 0.01–0.9% by weight of carbon black.

20 Claims, 1 Drawing Sheet

OPTICAL CABLE WITH IMPROVED TRACKING RESISTANCE

Figure 1:
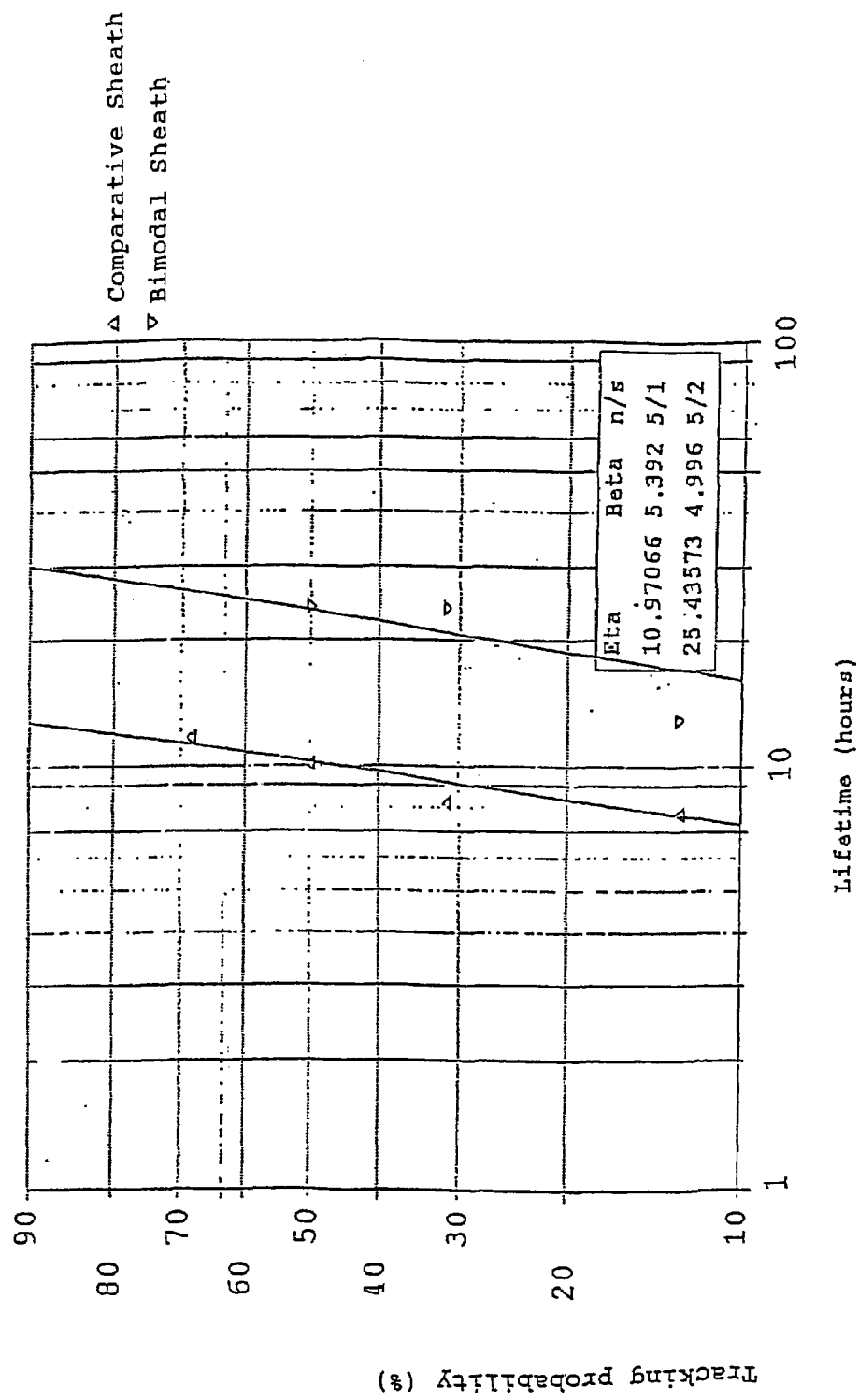

The present invention relates to an optical cable which comprises at least one optical fibre and an outer sheath which comprises a polymeric material having simultaneously good tracking resistance and mechanical properties.

Optical cables contain optical fibres for transmission of signals for any form of communication, data exchange or control purpose. For example, in GB A2 2 193 583 one type of such an optical cable is described. The contents of this document is included herein by reference. Besides optical fibres, optical cables comprise an outer sheath to protect these fibres. The outer sheath usually is based on a polymeric material such as a polyolefin, in particular polyethylene or a copolymer of ethylene, in which the ethylene monomer constitutes the greater part of the total mass of the polymer. The cable sheath must cope with the requirements of an easy production and good mechanical properties, such as tensile strength and elongation at break, especially, at increased temperatures up to 100° C. Further, the outer sheath should also have low heat deformation and good tracking resistance.

In particular, a good tracking resistance of the sheath is of high interest, because for practical reasons optical cables most often are installed adjacent to power cables. These power cables by their high voltages, particularly over 130 kV, generate strong electrical fields and thereby induce electrical voltages across regions of the sheaths of the neighbouring optical cables. This leads to creeping currents by tracking and further to local breakdown of the sheath, especially under damp conditions which is known as dry band arcing.

In order to avoid these problems, the optical cable must be protected against creeping currents by the outer sheath, i.e. the sheath must have good tracking resistance. However, at the same time the sheath must also fulfil other boundary conditions as there are a good processability of the cable sheath material so that the sheath can be produced in an efficient and economical manner, and good mechanical properties such as tensile strength, elongation at break and temperature resistance of the finished cable. With respect to the mechanical properties it must be considered that optical cables typically are designed to be freely suspended between support means spaced up to 500 m apart. In order to maintain a low signal attenuation in the final optical cable it is important that the shrinkage of the sheath is as low as possible. Furthermore, sheath materials usually comprise carbon black in an amount of 2% by weight or more.

DE-A-13504041 discloses an optical cable to be used in conjunction with power cables with a sheath consisting of material made self-extinguishing and tracking resistant by the addition of 30–60% by weight of a metal hydroxide. However, this high amount of metal hydroxide leads to an undesired deterioration of the mechanical properties of the sheath.

Japanese Patent Application 63-322299 discloses a track resisting material to be used especially in the form of shaped insulations applied for joints of outdoor cables etc. This track resistant material consists of 100–500 parts by weight of a thermoplastic rubber blended with 100 parts by weight of thermoplastic resin, wherein 20–50 parts by weight of magnesium hydroxide are mixed to 100 parts by weight of the said blend of thermoplastic rubber and thermoplastic resin. The contents of thermoplastic rubber causes poor values for Young's modulus tensile strength and elongation at break, especially at higher temperatures. The heat deformation is unacceptably high.

WO 93/05424 discloses an optical cable sheath material with a matrix of linear polyethylene containing 15–30 wt. % of metal hydroxide and optionally more than 1 wt. % of carbon black. However, the tracking resistance of this sheath material can still be improved.

The present invention has the object to design an optical cable with an outer sheath whereby this optical cable has an improved tracking resistance in combination with good mechanical properties. In particular, the invention has the object to design an optical cable having sufficient tracking resistance at the high electrical field strength occurring in the vicinity of power cables of voltages from 100–400 kV.

The present invention is based on the finding that such an optical cable can be provided if it comprises a sheath with a matrix formed by a multimodal ethylene polymer which has been obtained by coordination catalysed polymerisation.

Furthermore, the present invention is based on the finding that if such a polymeric material forms the matrix of the sheath, the carbon black contents can be reduced to a value of at most 0.9% by weight of the total sheath composition.

Therefore, the present invention provides an optical cable with improved tracking resistance comprising at least one optical fibre and an outer sheath which comprises a polymeric material, characterized in that the polymeric material forms a matrix for the sheath and is consisting of a multimodal olefin polymer obtained by coordination catalyzed polymerization, and in that the total composition of the sheath comprises 15–40% by weight of a metal hydroxide and 0.01–0.9% by weight of carbon black.

The optical cable according to the present invention on the one hand fulfills the requirement of an improved tracking resistance, particularly if the cable is installed near a high voltage power cable. It is believed that the improvement in tracking resistance is decisively influenced by use of multimodal polyolefin as a matrix for the sheath, which allows for a hydroxide contents of the sheath of up to 40%, combined with the reduced carbon black contents. On the other hand, the optical cable according to the invention has superior mechanical properties. These mechanical properties include good processability, low shrinkage and low abrasion/hard surface of the sheath. The carbon black contents gives the sheath material a black colour. Further, the optical cable possesses a resistance to stress cracking caused by climatic conditions and pollution in the atmosphere.

Thus, the cable according to the invention shows satisfactory values in all required conditions, even though the requirements of a good tracking resistance and good mechanical properties as well as good in-service stress conditions are at least partially contradictive.

Tracking is defined as the process that produces a track as a result of the action of electric arcs. The arc concentrates sufficient power to produce tracks and enough energy for the growth of the tracks. Failure occurs when the track extends enough to span the remaining distance between two electrodes or earth connection and therefore becomes a path of localised degradation on the surface of an insulating material. The tracking resistance is measured according to the inclined plane tracking test. Details of the applied test procedure according to this method are given in the Examples section.

Preferably, the metal hydroxide in the inventive optical cable sheath is magnesium hydroxide an/or aluminum hydroxide.

Further preferred, the optical cable sheath of the present invention has a tracking resistance according to the inclined plane tracking test as further defined in the Examples section of at least 15 h at 62.3% tracking propability level, i.e. $\eta \geq 15$ h, more preferred of at least 20 h at 62.3% tracking propability level, i.e. $\eta \geq 20$ h, and most preferred of at least 25 h at 62.3% tracking propability level, i.e. $\eta \geq 25$ h.

In a preferred embodiment of the invention the matrix for the sheath is consisting of multimodal polyethylene.

The molecular weight distribution of the polymer is characterized by way of its melt flow rate (MFR) according to ISO 1133. The melt flow rate is preliminary depending on the mean molecular weight. This is, because long, well packed molecules give the material a smaller flow tendency than short, less packed molecules. An increase in molecular weight means a decrease in MFR value. The melt flow rate is measured in g/10 min of the polymer discharge under specified temperature and pressure conditions and is a measure of the viscosity of the polymer, which in turn for each type of polymer is mainly influenced by its molecular weight distribution, but also by its degree of branching etc. The melt flow rate measured under a load 2.16 kg at 190° C. (ISO 1133, condition 4) is denoted as $MFR_2$.

In a further preferred embodiment, the ethylene polymer forming the matrix of the sheath has an $MFR_2$ of 0.01–10 g/10 min, more preferred of 0.1–1.0 g/10 min and most preferred of 0.3–0.6 g/10 min.

The molecular weight distribution (MWD) of the polymer material preferably is in the range of 3–12, more preferably 4–10.

The melt flow rate and the density of the material are decisive for strength properties, while the density only is decisive for the melting point, surface hardness, permeability and water absorption.

Preferably, the density of the ethylene polymer is 0.870–0.970 g/cm$^3$, more preferred 0.910–0.960 g/cm$^3$ and most preferred 0.930–0.950 g/cm$^3$.

The expression "modality of a polymer" refers to the form of its molecular weight distribution (MWD) curve, i.e. the appearance of the graph of the polymer weight fraction as a function of its molecular weight. If the polymer is produced in a sequential step process e.g. by utilizing reactors coupled in series and using different conditions in each reactor, the different polymer fractions produced in the different reactors will each have their own molecular weight distribution which may considerably differ from one another. The molecular weight distribution curve of the resulting final polymer can be looked at as the superposition of the molecular weight distribution curves of the polymer fractions which will accordingly show two or more distinct maxima or at least be distinctly broadened compared with the curves for the individual fractions. A polymer showing such a molecular weight distribution curve is called "bimodal" or "multimodal", respectively. Multimodal polymers can be produced according to several processes which are described e.g. in WO 92/12182.

It is known to produce multimodal, in particular bimodal, olefin polymers, preferably ethylene polymers, in two or more reactors connected in series. As instances of this prior art, mention can be made of EP 040 992, EP 041 796, EP 022 376, EP 0887379 and WO 92/12182. The contents of these documents is included herein by reference. According to the disclosure of these documents, each of the polymerisation stages can be carried out in liquid, slurry or gas phase.

The multimodal ethylene polymer forming the matrix of the sheath of the optical cable preferably is produced in a multi-stage process in a multi-step reaction sequence such as described in WO 92/12182 ("BORSTAR process"). The contents of this document is included herein by reference. In this process, in a first step ethylene is polymerised in a loop reactor in the liquid phase of an inert low-boiling hydrocarbon medium. Then, the reaction mixture after polymerisation is discharged from the loop reactor and at least a substantial part of the inert hydrocarbon is separated form the polymer. The polymer is then transferred in a second or further step to one or more gas-phase reactors where the polymerization is continued in the presence of gaseous ethylene. The multimodal polymer produced according to this process has a superior homogeneity with respect to the distribution of the different polymer fractions which cannot be obtained e.g. by a polymer mix.

The catalyst for the production of the ethylene polymer comprises chromium, Ziegler-Natta or metallocene catalysts. Preferably a single-site catalyst such as e.g. a metallocene catalyst is used. Preferred single-site catalysts are described in EP 688 794, EP 949 274, WO 95/12622 and WO 00/34341. The contents of these documents is included herein by reference.

Optionally, the main polymerisation stages may be preceded by a prepolymerisation, in which up to 20% by weight, preferably 1–10% by weight of the total amount of the polymer is produced.

The multimodal ethylene polymer forming the matrix of the sheath comprises a low molecular weight (LMW) ethylene homo- or copolymer fraction and a high molecular weight (HMW) ethylene homo- or copolymer fraction. Depending on whether the multimodal ethylene polymer is bimodal or has a higher modality, the LMW and/or HMW fraction may comprise only one fraction each or two or more subfractions. The expression "ethylene homopolymer" as used herein refers to an ethylene polymer that consists substantially, i.e. to at least 97% by weight, preferably at least 99% by weight, more preferably at least 99.5% by weight and most preferably at least 99.8% by weight of ethylene.

Preferably, the ethylene polymer is a bimodal polymer consisting of one LMW fraction and one HMW fraction.

It is further preferred that the ethylene polymer comprises an ethylene polymer fraction selected from
(a) a LMW ethylene polymer having a density of 0.860–0.975 g/cm$^3$, more preferably from about 0.930–0.975 g/cm$^3$ and most preferred of 0.955–0.975 g/cm$^3$, and an $MFR_2$ of 50–5000 g/10 min, more preferably of 100–1000 g/10 min and most preferred of 200–600 g/10 min, and
(b) a HMW polymer having a density of 0.870–0.945 g/cm$^3$, more preferably of 0.880–0.930 g/cm$^3$ and most preferably of 0.910–0.930 g/cm$^3$, and an $MFR_2$ of 0.01–10.0 g/10 min, more preferably of 0.01–0.8 g/10 min and most preferably of 0.05–0.3 g/10 min.

Thus, the low molecular weight ethylene polymer preferably is a high density type polyethylene (HDPE) and the high molecular weight ethylene polymer is a linear low density type polyethylene (LLDPE). Preferably, the ethylene polymer comprises both fractions (a) and (b).

At least one fraction of the ethylene polymer preferably is a copolymer which was polymerized with a $C_3$–$C_{12}$, more preferably $C_3$ to $C_8$ alpha-olefin, preferably with at least one comonomer selected from the group consisting of propylene, 1-butene, 4-methyl-1-pentene, 1-hexene and 1-octene.

Preferably, the amount of comonomer in the ethylene polymer is 0.02–5.0 mol %, more preferably 0.05–2.0 mol %.

Preferably, the HMW fraction is an ethylene copolymer, preferably copolymerised with one of the above-cited comonomers. Further preferred, the LMW fraction of the ethylene polymer is a homopolymer.

Further, it is preferred that if the ethylene polymer is produced according to the above-described BORSTAR process the LMW fraction is produced in the loop reactor and the HMW fraction in the gas-phase reactor.

In a preferred embodiment the ethylene polymer comprises at least 25% by weight, more preferred 35–55% by weight, still more preferred 43–51% by weight and most preferred 44–50% by weight of a low molecular weight ethylene polymer component, and less than 75% by weight, more preferred 65–45% by weight, still more preferred 57–49% by weight and most preferred 56–50% by weight of a high molecular weight ethylene polymer component.

The sheath of the optical cable according to the present invention contains a metal hydroxide, preferably magnesium hydroxide and/or aluminium hydroxide, in the range of 15–40% by weight. This amount of hydroxide is necessary to obtain a sufficient degree of tracking resistance in the sheath, although already polyolefins as such have a certain degree of resistance to tracking when exposed to surface discharges. With respect to the processing and mechanical properties of the polymer a degree of hydroxide as low as possible is desirable. However, it has been found that by the addition of a metal hydroxide in the above-given range the mechanical and processing properties of the polymer are still satisfactory with respect to the use as a sheath material.

Preferably, the total composition of the sheath comprises 20–30% by weight, and most preferred 25% by weight of a metal hydroxide, preferably magnesium hydroxide and/or aluminium hydroxide.

Further preferred, magnesium hydroxide is used.

Preferably, the carbon black contents in the sheath is from 0.1–0.8% by weight, more preferably from 0.3–0.6% by weight and most preferred 0.5% by weight.

It is further preferred that the ethylene polymer is present in the sheath in an amount as high as possible, i.e. apart from the further constituents magnesium and/or aluminium hydroxide and carbon black makes up the residue of the sheath material. However, further additives such as UV stabilizers may be present in small amounts.

When producing the sheath material, the ingredients thereof, such as ethylene polymer, magnesium and/or aluminium hydroxide, carbon black and optionally additives, should be mixed intimately in order to obtain a composition as homogeneous as possible to produce the outer sheath of an optical cable according to the present invention.

Compounding of the sheath material preferably is carried out according to the method described in WO 98/15591. The contents of this document is included herein by reference. According to this method, the magnesium hydroxide and/or the aluminium hydroxide and the carbon black may be mixed into the polymeric material in two or more separate steps by letting the polymer pass through the viscosity cross-over stage two or more times i.e. each step implies a separate compounding operation mixer or extruder. Both ingredients in the form of a fine powder are added in the proportion wanted in order to get best result and to get the ingredients as homogeneously into the sheath material as possible.

The powder should have low practical size as possible. Thus, the metal hydroxide, preferably magnesium hydroxide or aluminium hydroxide, preferably has a nominal particle size of 1.4–1.8 μm and the carbon black preferably has a nominal particle size of 10–30 nm, more preferably of 20 nm.

The optical cable according to the present invention has a superior environmental stress crack resistance (ESCR) resulting essentially from the multimodal ethylene polymer as a matrix for the sheath material. The ESCR is measured according to the standard ASTM D 1693/A, the reagent employed being Igepal CO-630, 10%. Preferably, the multimodal olefine, preferably ethylene, polymer is having an ESCR, F20 of >2000 h, more preferable of >8000 h. F20 means that 20% of the samples are cracked after the time indicated.

As mentioned above, the sheath shows a low shrinkage whereby the attenuation of the optical signal is prevented. Preferably, the shrinkage which is mainly determined by the polymer matrix is at most 1%. Thus, it is preferred that the shrinkage of the olefin, preferably ethylene, polymer is at most 1%.

In order to further illustrate the present invention, a preferred embodiment is described in the following by way of examples.

FIG. 1 shows the results of an inclined plane tracking test of a sheath material according to the present invention and a comparative material.

EXAMPLES

A bimodal polyethylene forming the matrix for the optical cable sheath according to the present invention was produced according to the following procedure.

In a polymerisation plant consisting of a loop reactor connected in series to a gas-phase reactor and involving the utilisation of a Ziegler-Natta catalyst, the bimodal ethylene polymer was polymerised under the following conditions.

The First Reactor (Loop Reactor)

In this reactor, a first polymer (polymer 1) was produced by the polymerisation of ethylene in the presence of hydrogen (molar ratio of hydrogen to ethylene=0.38:1). The resulting ethylene homopolymer had an $MFR_2$ value of 492 g/10 min and a density of 0.975 g/cm$^3$.

The Second Reactor (Gas Phase Reactor)

In this reactor, a second polymer (polymer 2) was produced by the polymerisation of ethylene and butene (molar ratio in the gas phase of butene to ethylene=0.22:1, of hydrogen to ethylene=0.03:1). The resulting copolymer of ethylene and butene was present in the form of an intimate mixture with the ethylene homopolymer from the first reactor, the weight ratio of polymer 1 to polymer 2 being 45:55.

The bimodal mixture of polymer 1 and polymer 2 had a density of 0.941 g/cm$^3$ and an $MFR_2$ value of 0.4 g/10 min. This product will in the following be referred to as "bimodal ethylene polymer".

In this Example, the shrinkage of the polymer produced was determined in accordance with a method (in the following referred to as UNI-5079) which had been developed in order to evaluate the shrinkage tendency of sheathing materials. The shrinkage is determined in the following manner.

Cable samples for the evaluation are extruded as follows.
Conductor: 3.0 mm solid, A1 conductor
Wall thickness: 1.0 mm
Temperature, die: +210° C. or +180° C.
Distance between die and water bath: 35 cm
Temperature, water bath: +23° C.

Line velocity: 75 m/min
Die type: Semi-tube
Nipple: 3.65 mm
Die: 5.9 mm
Screw Design: Elise
Breaking plate The shrinkage in percent is measured after 24 h in a room with constant temperature (+23° C.) as well as after 24 h at a temperature of +100° C. Cable samples measuring approximately 40 cm are measured. Conveniently, the cable sample is so marked that measurement after the conditionings can be carried out at the same point on the cable sample. Should the sample be found to shrink during measurement, marks of about 40 cm first have to be made. Then, the length is cut and remeasured. Double samples are taken of each cable that is to be analysed. The samples are placed in the room with constant temperature for 24 h, whereupon they are measured, and the shrinkage value in percent is calculated. All the samples are then placed on a talcum bed at +100° C. for 24 h. The samples are then measured, and the total shrinkage value in percent is calculated on the basis of the initial length. The measurements are indicated in Table 1 below.

TABLE 1

Material properties of bimodal ethylene polymer

| | |
|---|---|
| Tensile break strength (MPa)[1] | 34 |
| Elongation at break (%)[1] | 800 |
| ESCR[2] | 0/2000 h |
| Shrinkage (%) at | |
| 23° C./24 h[3] | 0.0 |
| 23° C./24 h[4] | 0.0 |
| Shrinkage (%) at | |
| 100° C./24 h[3] | 1.0 |
| 100° C./24 h[4] | 0.9 |

[1]Determined in accordance with ISO 527-2 1993/5A on cable samples.
[2]Determined in accordance with ASTM D 1693/A, 10% Igepal. The results are indicated as the percentage of cracked sample rods at a given time. F20 means that 20% of the sample rods were cracked after the time indicated.
[3]Determined in accordance with UNI-5079 after extrusion at 180° C.
[4]Determined in accordance with UNI-5079 after extrusion at 210° C.

It is evident from the values indicated in Table 1 that the bimodal ethylene polymer has superior properties as regards shrinkage, especially at room temperature, and environmental stress cracking resistance (ESCR).

Example 1

A cable sheath material was produced by compounding in a twin extruder at a maximal temperature of 180° C. 73.60 wt. % of the above described bimodal ethylene polymer with 25 wt. % of aluminium-hydroxide, 0.90 wt. % of carbon black and 0.50 wt. % of an UV stabilizer. This sheath material will in the following be referred to as "Bimodal sheath".

Example 2

Comparative Example

A cable sheath material was produced by compounding in a twin extruder at a maximum temperature of 180° C. 73.60 wt. % of a unimodal polyethylene (ME6080) with a MFR$_2$ of 0.2 and a density of 0.930 g/cm$^3$ with 25 wt. % of magnesium hydroxide, 0.90 wt. % of carbon black and 0.50 wt. % of an UV stabilizer. This sheath material will in the following be referred to as "Comparative sheath".

Tracking Tests

The bimodal sheath and the comparative sheath were given the inclined plane tracking test, essentially to standards BS 5604: 1984 and IEC 587: 1986 Method 1, Criterion A, but with modifications for test voltage and test duration. One voltage level (4.5 kV) was used for the test. Samples of the comparative sheath, which had been previously tested (and had survived) for 6 hours were tested for further 6 hours or to failure. Coupons of the inventive bimodal sheath were tested for 24 hours or until failure.

Each sheath material was supplied as coupons, which were 40 mm wide by 120 mm long and 6 mm thick. 5 coupons were tested for each sheath material.

Instead of halting the test when the first sample failed (this protocol is stipulated by IEC 587: 1986), the test was continued on the surviving coupons until either they failed one by one or for an agreed total time on samples that did not fail within each 6 hours block of testing. In practice it was found that at least one sample survived after each 6 hours of testing.

All samples were tested under the same conditions at room temperature (20° C.) according to the following parameters:

TABLE 2

Test parameters

| Test voltage (kV) | Contamination flow rate (ml/min) | Series resistance (kΩ) |
|---|---|---|
| 4.5 | 0.6 | 33 |

The contaminant solution was ammonium chloride (NH$_4$Cl) at a concentration of 0.1±0.002% by mass of water, mixed with 0.02±0.002% by mass of non-ionic wetting agent. All coupons were drilled to make mounting holes before fitting them to the inclined plane apparatus.

Samples were lightly roughened using a fine silica abrasive paper, applying de-ionised water to assist wetting of the surface. Samples, which had survived one 6 hours period, and were to be retested for a further 6 hours, were removed from the inclined plane apparatus. They were re-washed with de-ionised water immediately before the next 6 hours of testing and were re-mounted in exactly the same configuration as before. With the contaminant flowing uniformly at the specified rate (see Table 2), the voltage was applied, raised to the preferred test voltage (4.5 kV) and then maintained constant. The timing device was then started.

Each compound was tested for a maximum of 24 hours or until the 60 mA tripping current was reached (Criterion A) or to flame failure if this occured before the tripping current was reached.

The results of the tracking test of the inventive bimodal sheath and the comparative sheath are shown in Table 1.

TABLE 1

| | Failure time (h:min) | Failure type |
|---|---|---|
| | Comparative Sheath | |
| Coupon 1 | 10:05 | Flame failure |
| Coupon 2 | 8:10 | Flame failure |
| Coupon 3 | 11:40 | Current trip |

TABLE 1-continued

|  | Failure time (h:min) | Failure type |
|---|---|---|
| Coupon 4 | >12:00 | No failure |
| Coupon 5 | 7:40 | Flame failure |
| Bimodal sheath according to invention | | |
| Coupon 1 | >24:00 | No failure |
| Coupon 2 | 23:50 | Flame failure |
| Coupon 3 | >24:00 | No failure |
| Coupon 4 | 12:55 | Flame failure |
| Coupon 5 | 24:00 | Flame failure |

The data of Table 1 have further been evaluated as shown in FIG. 1. The abscissa in FIG. 1 shows the lifetime of the coupon x on a logarithmical scale and the ordinate shows the tracking propability F in %. The tracking propability for each coupon has been determined by sorting the lifetime data for each sample type in increasing order and then calculating F according to the equation:

$$F=(i-0.3)/(n+0.4)$$

wherein i is the order of the sorted data point and n is the total number of data points.

For the statistical evaluation of lifetime values, the Weibull distribution $$F(x) = 1 - \exp\left(-\left(\frac{(x-\eta)}{\beta}\right)\right)$$

was used.

Herein, F(x) is the above mentioned tracking propability, i.e. the propability that a certain sample has a lifetime shorter than x.

$\eta$ is the scale parameter and gives the lifetime at a 63.2% tracking propability level. Thus, $\eta$ is a measure for the tracking resistance of the tested sheath. $\beta$ is the shape parameter and a measure of the scattering of the values. The results of this evaluation are shown in FIG. 1.

For the inventive bimodal sheath, a value for $\eta$ of 25.43 and for $\beta$ of 5.0 was obtained. For the comparative sheath, a value for $\eta$ of 10.97 and for $\beta$ of 5.4 was obtained The results show that the inventive bimodal sheath has a significantly higher tracking resistance than the comparative sheath at similar scattering level of the test values.

The invention claimed is:

1. Optical cable with improved tracking resistance comprising at least one optical fibre and an outer sheath which comprises a polymeric material, characterized in that the polymeric material forms a matrix for the sheath and is consisting of a multimodal olefin polymer obtained by coordination catalyzed polymerization, and in that the total composition of the sheath comprises 15–40% by weight of magnesium hydroxide and/or aluminium hydroxide and 0.01–0.9% by weight of carbon black.

2. Optical cable according to claim 1, characterized in that said matrix for the sheath is consisting of a multimodal ethylene polymer.

3. Optical cable according to claim 2, characterized in that said ethylene polymer has a density of 0.870–0.970 g/cm3 and a MFR2 of 0.01–10 g/min.

4. Optical cable according to claim 1, characterized in that said polymer has MWD of 3–12.

5. Optical cable according to claim 1, characterized in that said polymer is a bimodal polymer.

6. Optical cable according to claim 2, characterized in that said ethylene polymer comprises an ethylene polymer fraction selected from
 (a) a low molecular weight ethylene polymer having a density of 0.860–0.975 g/cm3 and an MFR2 of 50–5000 g/10 min, and
 (b) a high molecular weight ethylene polymer having a density of 0.870–0.950 g/cm3 and an MFR2 of 0.01–10 g/10 min.

7. Optical cable according to claim 2, characterized in that at least one fraction of said ethylene polymer is a copolymer which was polymerized with at least one comonomer selected from the group consisting of propylene, 1-butene, 4-methyl-1-pentene, 1-hexene and 1-octene.

8. Optical cable according to claim 2, characterized in that said ethylene polymer comprises 35–55% by weight of a low molecular weight ethylene polymer component and 65–45% by weight of a high molecular weight ethylene polymer component.

9. Optical cable according to claim 1, characterized in that the total composition of the sheath comprises 20–30% by weight of magnesium hydroxide and/or aluminium hydroxide.

10. Optical cable according to claim 1, characterized in that the magnesium hydroxide and/or aluminium hydroxide has a nominal particle size of 1.4–1.8 μm.

11. Optical cable according to claim 1, characterized in that the total composition of the sheath comprises 0.1–0.8% by weight of carbon black.

12. Optical cable according to claim 1, characterized in that the carbon black has a nominal particle size of 10–30 nm.

13. Optical cable according to claim 1 characterized in that it has a tracking resistance of at least 15 h at 62.3% tracking propability level.

14. Optical cable according claim 2, characterized in that said polymer has MWD of 3–12.

15. Optical cable according to claim 3, characterized in that said polymer has MWD of 3–12.

16. Optical cable according to claim 2, characterized in that said polymer is a bimodal polymer.

17. Optical cable according to claim 3, characterized in that said polymer is a bimodal polymer.

18. Optical cable according to claim 4, characterized in that said polymer is a bimodal polymer.

19. Optical cable according to claim 3, characterized in that said ethylene polymer comprises an ethylene polymer fraction selected from
 (a) a low molecular weight ethylene polymer having a density of 0.860–0.975 g/cm3 and an MFR2 of 50–5000 g/10 min, and
 (b) a high molecular weight ethylene polymer having a density of 0.870–0.950 g/cm3 and an MFR2 of 0.01–10 g/10 min.

20. Optical cable according to claim 4, characterized in that said ethylene polymer comprises an ethylene polymer fraction selected from
 (a) a low molecular weight ethylene polymer having a density of 0.860–0.975 g/cm3 and an MFR2 of 50–5000 g/10 min, and
 (b) a high molecular weight ethylene polymer having a density of 0.870–0.950 g/cm3 and an MFR2 of 0.01–10 g/10 min.

* * * * *